Jan. 15, 1957   O. E. STAPLES   2,777,209
GEAR CHECKING APPARATUS
Filed Nov. 9, 1951   2 Sheets-Sheet 1

INVENTOR.
OTIS E. STAPLES
BY Hudson, Boughton,
Williams, David & Hoffmann
ATTORNEYS Jan. 15, 1957  O. E. STAPLES  2,777,209
GEAR CHECKING APPARATUS
Filed Nov. 9, 1951  2 Sheets-Sheet 2
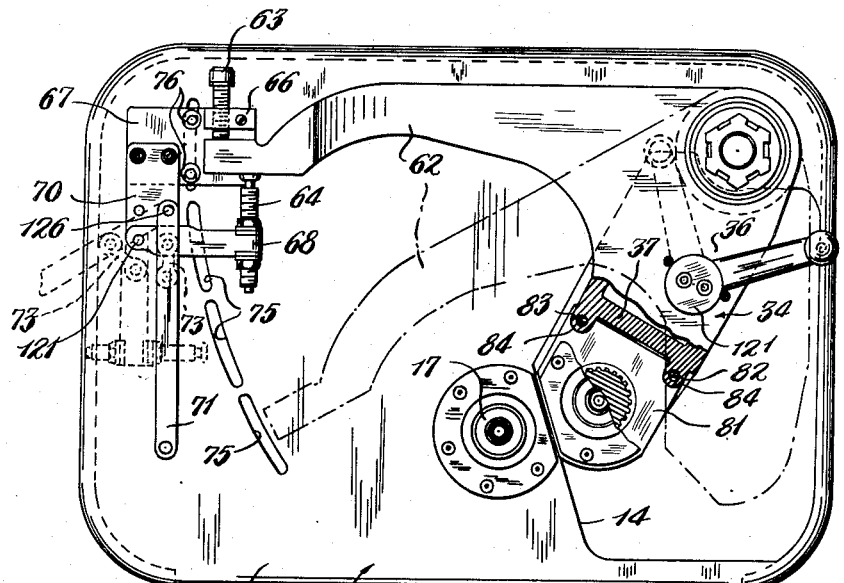
FIG. 3
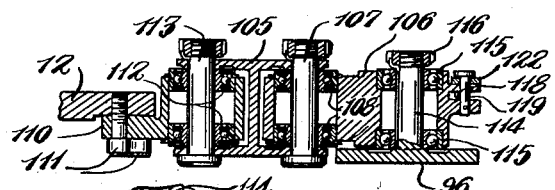
FIG. 4
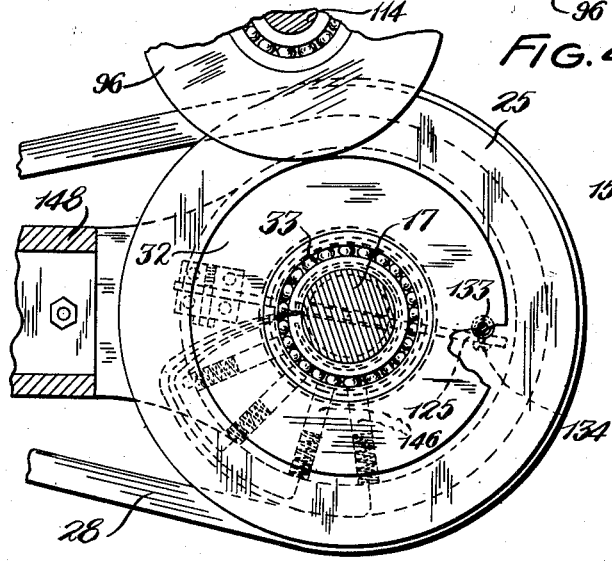
FIG. 5
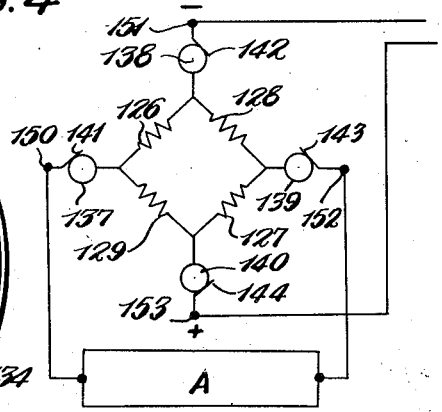
FIG. 7
FIG. 6
INVENTOR.
OTIS E. STAPLES
BY Hudson, Boughton,
Williams, David & Hoffmann
ATTORNEYS

United States Patent Office 2,777,209
Patented Jan. 15, 1957

2,777,209

GEAR CHECKING APPARATUS

Otis E. Staples, Euclid, Ohio, assignor to The Cleveland Hobbing Machine Company, Euclid, Ohio, a corporation of Ohio Application November 9, 1951, Serial No. 255,613

10 Claims. (Cl. 33—179.5)

The present invention relates to a new and improved apparatus and method for checking the accuracy of gears.

The principal object of the present invention is the provision of a new and improved apparatus and method for checking the accuracy of gears by meshing a gear to be checked with a gear of known accuracy and referred to herein as a master gear, driving one gear by the other and measuring the relative instantaneous angular displacements of the gears.

Another object of the invention is the provision of a new and improved gear checking apparatus comprising means for meshing a gear to be checked with a master gear and driving one gear by the other, in combination with means for indicating and/or recording the instantaneous angular displacement of one gear relative to the other.

A more specific object of the invention is the provision of a new and improved gear checking apparatus comprising means for meshing a master gear with a gear to be checked, power means for driving one of the gears, and means to indicate instantaneous relative movements between two members, one of which members has movement synchronized with the rotation of one of the gears and the other of which members has movement synchronized with the rotation of the other of the gears.

A further object of the invention is the provision of a new and improved gear checking apparatus comprising means for meshing a master gear with a gear to be checked and driving one gear by the other, two relatively rotatable members on a common axis, one member being driven in synchronism with one of the gears and the other member being driven in synchronism with the other gear, and means for indicating instantaneous angular movements of one member relative to the other, including a strain gauge bar having one end attached to one member and the other end deflectable by engagement with the other member.

Still another object of the invention is the provision of a gear checking apparatus including a drive spindle and driven spindle adapted to hold a master gear and a gear to be checked in mesh, and a mechanism for indicating relative angular instantaneous variances between the two spindles, which mechanism includes a rotatable member driven by one of the spindles through a plurality of friction wheels, one of which wheels is tapered and movable axially relative to other friction wheels engaged therewith to regulate the speed ratio between the one spindle and rotatable member.

A further object of the invention is the provision of a gear checking apparatus including a drive spindle and a driven spindle adapted to hold a master gear and a gear to be checked in mesh, one of the spindles having an adjustable loading mechanism associated therewith whereby the gears may be made to mesh under a selectable load.

The invention resides in certain constructions and steps of process and further objects and advantages will be apparent to those skilled in the art to which it relates from the following description of the preferred embodiment described with reference to the accompanying drawing forming part of this invention in which:

Fig. 3 is a plan view of the gear checking apparatus, certain parts being broken away and shown in section;

Fig. 4 is a sectional view taken along line 4—4 of Fig. 2;

Fig. 5 is a fragmentary sectional view taken along line 5—5 of Fig. 1 but on a larger scale;

Fig. 6 is a wiring diagram of a strain gauge measuring and recording instrument; and Fig. 7 is an elevational view of a recording tape of the recording instrument.

Figure 2:
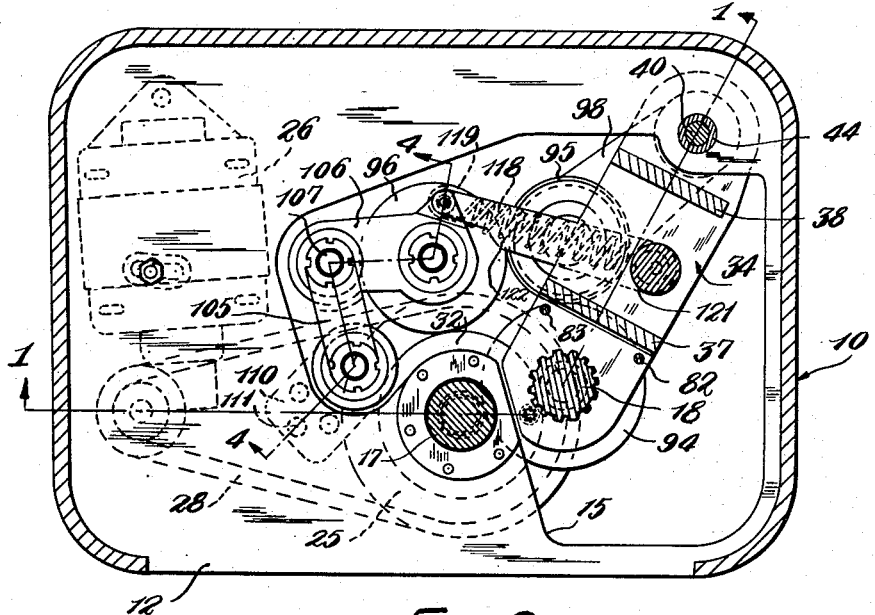
Fig. 2 is a sectional view of the gear checking apparatus taken along the line 2—2 of Fig. 1.
Figure 1:
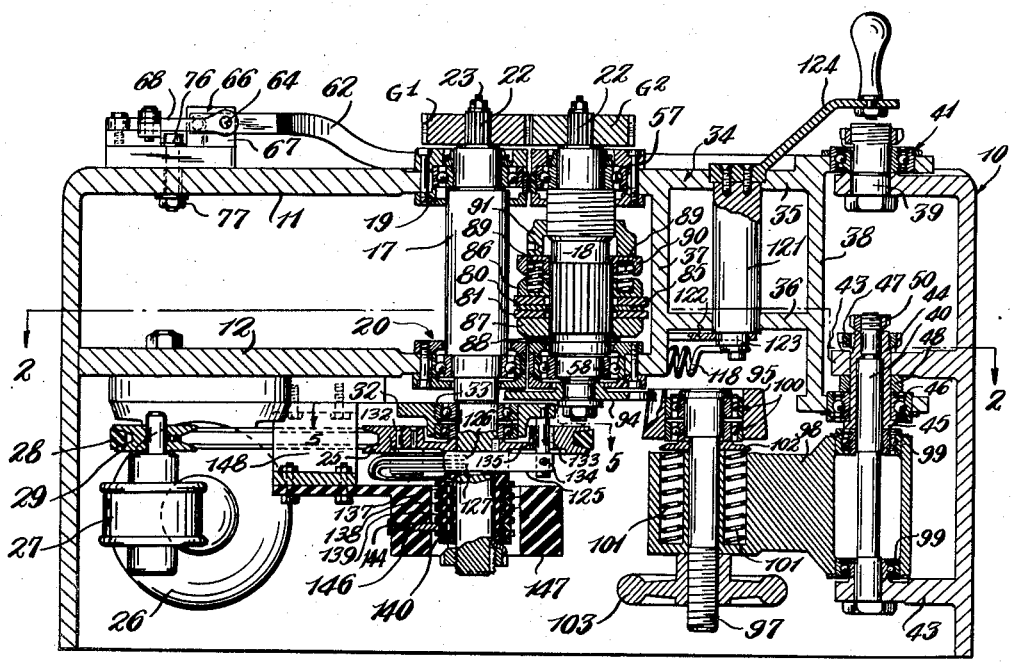
Fig. 1 is a sectional view of a gear checking apparatus, the section being taken substantially along line 1—1 of Fig. 2.

Generally speaking, the invention contemplates the provision of apparatus having two gear spindles on which a gear of known accuracy, referred to as a master gear, and a gear to be checked or tested can be mounted in mesh with one another, power means for driving one of the spindles, two independently rotatable members arranged to rotate in the same direction on a common axis and in timed relation to the rotation of the two spindles, and means for indicating the relative instantaneous angular displacement of the two members. In the preferred form of the invention an electrical resistance element, the resistances of which varies according to the degree of deflection thereof, is employed for measuring the displacement of the two members. One part of the resistance member is mechanically attached at one end to one of the rotatable members and another part thereof to the other rotatable member in such manner that differences in angular displacements between the members causes deflection and corresponding variation in electrical resistance in the element. The resistance element is electrically connected with a current measuring and recording instrument whereby the recorded variations in the electrical resistance provides a chart of the instantaneous variations in angular displacements between the master gear and the gear being checked. Reference to the recorded variations graphically indicates the character of the drive between the master gear and the gear tested whereby errors in gear formations can be readily detected.

Referring to the drawings, a gear checking apparatus embodying the invention is shown for checking the accuracy of gears with respect to lead error, involute error, eccentricity, tooth to tooth error, etc. The apparatus comprising a suitable housing 10 including a top wall 11 and an intermediate wall 12 parallel to the top wall. The top wall 11 has a more or less rectangular opening 14 at one end thereof and the wall 12 has an irregular opening 15 generally in registration with the opening 14. The bottom of the housing is preferably open and is adapted to rest on any suitable support, not shown.

Two gear spindles 17, 18 are rotatably supported in the housing and are adapted to have a master gear G1 and a gear to be checked G2, attached thereto, in mesh with one another; however the gears could be transposed, if desired. The spindle 17 is journalled in suitable antifriction bearings 19, 20 located in aligned openings through the walls 11, 12 and the ends of the spindle project above and below the respective walls. The upper ends of both spindles are each reduced in diameter to form a gear engaging shoulder for supporting the gear thereon and the gears are locked to their respective spindles by expanding collets 22, although another suitable attaching means could be employed.

The lower end of the spindle 17 has a pulley 25 keyed thereto which is driven by a suitable electric motor 26 through a gear reduction box 27 and a belt 28 drivingly connecting a pulley 29 of the gear box 27 and the pulley 25. The motor 26 is preferably supported on the underside of the housing wall 12 and is controlled by a suitable switch, not shown.

A friction wheel 32 is rotatably supported on the spindle 17 immediately above pulley 25 by antifriction bearings 33 and it rotates independently of pulley 25 but on an axis common to the pulley axis. The wheel 32 is driven in synchronism with the spindle 18 by a drive mechanism described more fully hereinafter so that the driving impulses imparted to the spindle 18 by the meshing teeth of the master and test gears result in angular movements or oscillations of the wheel relative to the pulley 25.

The spindle 18 is translatably supported parallel to spindle 17 by a pivoted arm structure 34 which is journalled at one end to the housing so that the spindle 18 can be adjustably positioned laterally of the spindle 17 whereby various sizes of gears attached to the spindles can be placed in proper meshing engagement. The arm structure 34 includes top and bottom sections 35, 36 interconnected by webs 37, 38 and one end thereof is pivoted on a bolt 39 and a shaft 40 supported by the housing 10. The bolt 39 extends through an opening in the housing wall 11, and the inner race of a roller bearing 41 is attached thereon and the outer race of the bearing is attached in an opening through the arm section 35. The bolt 39 and the bearing are secured in place by a nut threaded on the pin, as shown. The shaft 40 has a head on one end and extends through openings through housing wall 12 and a lug 43 formed on the housing, and is coaxial with the bolt 39. A sleeve 44 surrounds the upper part of shaft 40 and has a flange 45 at the lower end against which the inner race of a roller bearing 46 rests. The outer race of bearing 46 is attached in an opening through section 36 of the arm 34. The flange of sleeve 44 is drawn against the bearing 46 by a nut 47 threaded on the upper end of the sleeve and a spacer 48 is preferably interposed between the upper side of the bearing and the underside of the housing wall 12. The shaft 40 is secured in place by a nut 50 threaded on the upper end thereof, as shown.

The spindle 18 is journalled in roller bearings 57, 58 in openings through the sections 35, 36 of the arm structure 34, and the upper end of the spindle projects above the arm structure and is formed similarly to the upper end of spindle 17 as described previously so that gears may be attached thereto.

As mentioned previously, the arm 34 is adjustably positioned on its pivot and for this purpose the top section 35 thereof has an arm 62 integral therewith which extends toward the left hand end of the housing. The end of the arm 62 is adjustably positioned to effect the desired depth of tooth engagement between the gears on the spindles by two bolts 63, 64 adapted to engage opposite sides of the arm. The bolt 63 is threaded in an opening through an upright flange 66 of a block 67, and the bolt 64 is threaded in an opening through a lever 68 pivoted to an extension 70 on block 67. The lever 68 extends transversely of an operating lever 71 which is pivoted to the extension 70, and the operating lever is connected to lever 68 by a link 73. The link 73 locks lever 68 in the full line position shown in Fig. 3 at which time the link and operating lever 71 extend in the same direction. The block 67 is adjustably positioned on the housing wall 11 according to the angle desired for the arm 62, and for this purpose a series of arcuate slots 75 are formed in the housing wall 11 which lie on an arc having its center at the pivot of the arm 34. Two bolts 76 project through openings through block 67 and through the particular slots 75 over which the block 67 is positioned, and nuts 77 are threaded on the bolts and clamp against the underside of wall 11 to secure the block in position.

Preferably, the spindle 18 has a drag or brake mechanism thereon to impose a suitable load on the gears during checking thereof, and in the form shown, the brake comprises a pair of plates 80, 81 having openings therethrough through which the spindle 18 loosely extends and one end of which has a pair of openings through which posts 82, 83 extend to prevent rotation of the plates. The upper ends of the posts 82, 83 are supported by lugs 84, projecting from the web 37 of the arm structure 34 and the lower ends are supported in recesses in section 36 of arm 34. The plates 80, 81 may move vertically on the posts but are restrained by the latter from turning. An intermediate friction plate 85 is interposed between plates 80, 81 and two annular brake plates 86, 87 engage the top and bottom plates 80, 81, respectively. The plates 85, 86, 87 are all splined to the spindle 18 and rotate therewith. Plate 87 rests on a washer 88 on bearing 58 and plate 86 is pressed to plate 80 by a plurality of springs 89, only two of which appear in the drawings, which are located in sockets formed in the plate 86 and corresponding sockets in a like plate 90 splined to the spindle and positioned thereon by an adjusting nut 91 threaded on the spindle. By adjusting the nut 91 the spring pressure urging the plates 80, 81, 85, 86, 87 together may be regulated and the friction of plates 85, 86, 87 on plates 80, 81 provide the desired resistance or braking on spindle 18.

As mentioned previously, the wheel 32 is adapted to be driven in synchronism with the rotation of the spindle 18 and in the same direction as the pulley 25 rotates, and preferably this is accomplished through a friction drive comprising a train of friction wheels 94, 95, 96, which are arranged so that wheel 94 drives wheel 95 which drives wheel 96 and the latter drives wheel 32. Alternatively, any other suitable drive could be used which would drive wheel 32 at the precise speed of spindle 18. In the drive shown, the wheel 95 is journalled on a shaft 97 carried at the free end of an arm 98, and the other end of the arm is pivoted on shaft 40 by roller bearings 99 so that the arm can swing with arm 34 and maintain engagement between the wheels 94, 95 throughout the pivotal movement of arm 34. The wheel 95 is preferably tapered as shown and may be adjusted axially to vary the effective diameter thereof in engagement with wheels 94, 96 whereby the wheel 32 may be driven at exactly the same velocity as spindle 18 irrespective of minute differences in diameters of the friction wheels 94, 96 and 32. The wheel 95 is journalled in roller bearings 100 attached to the upper end of the shaft 97, which shaft is biased upwardly by springs 101 which are located in bores in the arm 98 and the upper ends of which bear against a washer 102 abutting the underside of the lowermost bearing 100. Upward movement of the shaft 97 is limited by the hub of a handwheel 103 threaded on the shaft 97 and engaging the underside of the arm 98. It will be seen that by turning the handwheel 103 in one direction or the other, the friction wheel 95 is moved axially one way or the other.

The friction wheel 96 is supported on a jointed arm comprising an H-shaped member 105, and a member 106, which members are pivotally connected at one end by a pin 107, as shown, and preferably the member 106 is carried on roller bearings 108 on the pin 107. The other end of member 105 is pivotally attached to a tubular bracket 110, which is secured to the housing wall 12 by bolts 111, by roller bearings 112 supported in the bracket and on a bolt 13, as shown. The wheel 96 has a stub shaft 114 which is journalled in member 106 by antifriction bearings 115, and the shaft is held in place by a nut 116 threaded on the end thereof.

The friction wheels 94, 95, 96, 32 are held in frictional engagement by a spring 118, one end of which is attached to a pin 119 on the member 106 and the opposite end of which is connected to a pin formed on the lower end of a shaft 121 journalled between the sections 35, 36 of the arm 34. The spring 118 draws wheel 96 to wheels 32, 95 and wheel 95 is urged against wheel 94 since arm 98 is free to pivot. The friction wheel can be released from the influence of spring 118 by a link 122 one end of which is connected to the pin 119 on member 106 and the other end of which is journalled on an eccentric 123 on the lower end of the shaft 121. The eccentric 123 is adapted to actuate link 122 to move wheel 96 from wheel 95 when the shaft 121 is rotated to the position shown in dotted lines in Fig. 2 by operation of a handle 124 fixed to the upper end of the shaft 121.

It is apparent that the wheel 32 is driven in synchronism with the spindle 18 and that while the average R. P. M. of the pulley 25 and wheel 32 are exactly the same where both gears G1, G2 are accurate, there will be minor variations in the velocity of the wheel due to the interaction of the gear teeth which causes the wheel to oscillate slightly relative to the pulley. Similarly, gear malformations of various types cause different forms of velocity variations.

The instantaneous angular movements of wheel 32 relative to spindle 17 may be indicated or measured by any suitable means, and in the form shown, this means includes a strain gauge bar 125 having four resistance coils 126, 127, 128, 129, fixed thereon, two on opposite sides of the bar, and which form the arms of a Wheatstone bridge circuit. Strain gauge bars and devices for measuring currents through the resistances thereof are well known and further reference to the details of operation thereof are deemed unnecessary. The strain gauge bar 125 has one end supported on the pulley 25 by a bracket 132 riveted to the pulley, and the other end attached to the wheel 32 so that the bar is deflected one way or the other by changes in angular movement between the wheel and pulley. Alternatively, the strain gauge bar could be attached to the spindle 17 or to a member attached to the spindle other than the pulley 25. In the embodiment shown, the strain gauge bar 125 extends through an opening through the spindle 17, and is attached to a flat surface of a pin 133 by a screw 134, which pin is secured to the wheel 32 and projects downwardly through an opening 135 through the pulley 25. The opening 135 is somewhat larger than the diameter of pin 133 so that wheel 32 and pulley 25 may have an appreciable angular displacement relative to one another without the pin engaging the pulley.

The leads of the resistance coils 126, 127, 128, 129 are connected with collector rings 137, 138, 139, 140, supported on the lower end of the spindle 17, which rings are insulated from the spindle and one another. Resistances 126, 129 are connected to a common lead attached to ring 137, resistances 126, 128 are connected to a common lead attached to ring 138, resistances 128, 127 are connected to a common lead attached to ring 139, and resistances 127, 129 are connected to a common lead attached to ring 140, as shown in Fig. 6. The collector rings are engaged by brushes 141, 142, 143, 144, respectively, which are individually located in bores 146 in an insulation block 147 which has an opening receiving the lower end of the spindle 17, and which block is supported by a bracket 148 attached to wall 12. Only the brush 144 appears in the drawings which show the structure of the apparatus, but all the brushes are schematically shown in the diagrammatic view of Fig. 6. The brushes are connected with the terminals 150, 151, 152, 153, respectively, of a suitable circuit analyzer having a potential applied across the terminals 151, 153 and an electric current responsive indicator A connected between terminals 150, 152. The indicator A is preferably of the type having a moving recording tape T on which a line is L-marked by a pen, not shown, attached to an arm which moves transversely of the tape according to the current flow through the indicator. Such instruments are available commercially and it is deemed unnecessary to describe the details of operation thereof.

Resistance coils 126, 127 are on one side of the bar 125 and coils 128, 129 are on the opposite side, and as the bar is deflected in one direction, the resistance of coils 126, 127 increases while that of coils 128, 129 decreases and vice versa. Suitable adjustments are provided in the instrument by which the pen carrying arm of the indicator A can be made to rest on the centerline of the recording tape when the bar 125 is in a position in which pin 133 is substantially centered in opening 135 through the pulley 25. It will be apparent that as the wheel 32 moves angularly relative to the pulley, the bar 125 is flexed thereby changing the resistance of the coils and the resulting line marked on the tape by the recording pen clearly indicates an increase or decrease in velocity of wheel 32 relative to the pulley by moving to one side or the other of the centerline of the tape, and the degree of the increases and decreases is indicated by the amplitude of deflections of the line.

In checking a gear, a master gear of known accuracy is attached to either one or the other of spindles 17 or 18 and the gear to be checked is attached to the other spindle in mesh with the master gear. In the embodiment shown, gear G1 is assumed to be the master gear and G2 is the gear to be checked, although the positions of these gears could be reversed. Motor 28 is energized to drive spindle 17 at a suitable rate and the spindle 18 is driven by the gears G1, G2 and has an angular motion according to the manner in which the gears G1 and G2 mesh. If the gear G2 is accurately formed, the velocity of spindle 18 increases and decreases relative to the speed of the spindle 17 at regular intervals, and wheel 32 is rotated in synchronism therewith. This varying velocity of the wheel 32 relative to the pulley 25 causes the strain gauge bar to be alternately flexed, which flexure is registered on the tape T by the line L which deflects at regular intervals, as illustrated in Fig. 7.

If one or more of the teeth of gear G2 are imperfectly formed for example, the velocity of the spindle 18 and wheel 32 will deviate relative to that of the pulley 25, causing the instrument A to record a corresponding deviation in the line on the recording tape. Likewise, eccentricity of gears appears in the recording on the tape by a shifting of the recording line to one side of the centerline of the tape. By examining the character of the deflections of the line L, and the spacing of the waves formed thereon, the operator may quickly and accurately determine any error or errors in the gear being tested. Recordings of gears having known defects can be made so that the characteristics of these various defects can be used for a comparison with recordings of unchecked gears to facilitate analysis of the records made of unchecked gears.

It is apparent that all the objects and advantages enumerated, as well as others, have been achieved and that I have provided an extremely sensitive and convenient method and apparatus for checking the accuracy of gears so that errors in the formation thereof may be quickly detected and any deficiencies which appear may be readily located. While the preferred form of the invention has been described in considerable detail, it will be apparent that the invention is not limited to the constructions and processes shown and it is my intention to cover hereby all adaptations, modifications and changes therein which come within the practice of those skilled in the art to which the invention relates and the scope of the appended claims.

Having thus described my invention, I claim:

1. A gear checking apparatus comprising a support having a gear spindle journalled thereon, power means for rotating said spindle, a member carried by said spindle and rotatable therewith, a friction wheel rotatable coaxial with the axis of said spindle, a second gear spindle, a friction wheel on said second spindle, a train of idler friction wheels adapted to be in frictional driving relation, one of said train of idler wheels adapted to frictionally engage the first mentioned friction wheel and another of said train of idler wheels adapted to frictionally engage the second mentioned friction wheel, one of said train of idler friction wheels being tapered, means for selectively causing relative axial movement between said tapered wheel and a wheel in engagement therewith, and means for indicating relative angular movements of said member and said first mentioned friction wheel.

2. A gear checking apparatus comprising a support having a gear spindle journalled thereon, power means for rotating said spindle, a member carried by said spindle and rotatable therewith, a friction wheel carried by said spindle and rotatable independently thereof, a second gear spindle, a friction wheel on said second spindle, a train of idler friction wheels adapted to be in frictional driving relation, one of said train of idler wheels adapted to frictionally engage the first mentioned friction wheel and another of said train of idler wheels adapted to frictionally engage the second mentioned friction wheel, one of said train of friction wheels being tapered, means for adjusting the position of the tapered wheel axially relative to the other of friction wheels engaged thereby, and means for indicating relative angular movements of said member and said first mentioned friction wheel.

3. In a gear checking apparatus as set forth in claim 2, in which the second gear spindle has a plate surrounding a portion of said spindle and connected to said support to prevent rotation thereof, a plate splined to said second spindle and movable against the first mentioned plate, and means for yieldingly urging the second mentioned plate to the first mentioned plate.

4. In a gear checking apparatus as set forth in claim 2, having a plate surrounding a portion of said second gear spindle and connected to said support to prevent rotation of said plate, a plate splined to said second gear spindle and movable against the first mentioned plate, and adjustable means for yieldingly urging the second mentioned plate to the first mentioned plate.

5. In a gear checking apparatus as set forth in claim 4, in which the means for indicating relative angular movement between said member and said first-mentioned friction wheel comprises an electric strain gauge.

6. A gear checking apparatus comprising a support having a gear spindle journalled thereon, power means for rotating said spindle, a member carried by said spindle and rotatable therewith, a friction wheel carried by said spindle, and rotatable independently thereof, a second gear spindle, means journalling said second spindle, a friction wheel on said second spindle, a train of idler friction wheels adapted to be in frictional driving relation, means to support said idler wheels for translational movement relative to one another, means to bias said friction wheels into frictional engagement with one another, one of said idler wheels adapted to frictionally engage the first mentioned friction wheels and the other idler wheel adapted to frictionally engage the second mentioned friction wheel, one of said idler wheels being tapered, means to cause relatively axial movement between said tapered wheel and a wheel engaged thereby, and means for indicating relative angular movements of said members.

7. In a gear checking apparatus as set forth in claim 1, in which the means for indicating relative angular movement between said member and said first-mentioned friction wheel comprises an electric strain gauge.

8. In a gear checking apparatus as set forth in claim 6, in which the means for indicating relative angular movement between said member and said first-mentioned friction wheel comprises an electric strain gauge.

9. In a gear checking device of the character referred to, a member pivoted on a support, abutting surfaces on said pivoted member spaced to receive forces tending to produce opposite rotations of said pivoted member, a second member fixable to said support in at least one position, a first adjustable abutment carried by said second fixable member for cooperation with one of said abutting surfaces, a second adjustable abutment pivotally mounted on said second fixable member for cooperation with the other said abutting surface, a lever pivoted to said second fixable member, and a linkage one end of which is pinned to said lever and the other end of which is pinned to said second pivotally mounted abutment for moving said second abutment into and out of engagement with said second abutment surface, the pinned connections of said lever and linkage lying in substantially a straight line when said lever is in a locking position, said straight line being substantially perpendicular to the line connecting the pinned joints on said second pivotally mounted abutment.

10. In a gear checking apparatus, a frame, a first gear spindle, a second gear spindle generally parallel to said first gear spindle, means mounting said spindles on said frame for rotation with respect thereto and for relative movement toward and away from each other, power means for driving said first spindle, a member coaxial with said first gear spindle and rotatable therewith, first friction wheel means rotatably supported in a predetermined position with respect to said first gear spindle and rotatable with respect thereto including a first friction wheel coaxial with and carried by said member, second friction wheel means rotatably supported in a predetermined position relative to said second gear spindle and rotated therewith and including a second friction wheel coaxial with and carried by said second gear spindle, third friction wheel means interconnecting said first friction wheel means and said second friction wheel means and engaging a wheel of said first and second friction wheel means respectively, one of said friction wheel means including a tapered friction wheel, means supporting said tapered friction wheel for axial movement relative to the friction wheels in engagement therewith, means supporting said third friction wheel means for movement parallel to the planes of said first and second friction wheels to maintain engagement of said third friction wheel means with said first friction wheel means and said second friction wheel means upon relative movement therebetween, and means for indicating relative movement between said member and said first gear spindle.

References Cited in the file of this patent

UNITED STATES PATENTS

| 1,233,014 | Baker | July 10, 1917 |
| 1,505,515 | Wirrer | Aug. 1, 1924 |
| 1,647,032 | Birkigt | Oct. 25, 1927 |
| 1,911,435 | Condon | May 30, 1933 |
| 2,116,895 | Howard | May 10, 1938 |
| 2,322,319 | Ruge | June 22, 1943 |
| 2,360,442 | Oliphant | Oct. 17, 1944 |
| 2,477,085 | Rieber | July 26, 1949 |
| 2,487,681 | Weisselberg | Nov. 8, 1949 |
| 2,539,239 | Ernest | Jan. 23, 1951 |
| 2,585,528 | Aeppli | Feb. 12, 1952 |
| 2,602,236 | Muller | July 8, 1952 |
| 2,687,576 | Mahr | Aug. 31, 1954 |

FOREIGN PATENTS

| 157,090 | Germany | Mar. 23, 1922 |
| 444,209 | Great Britain | Mar. 17, 1936 |